United States Patent
White

(10) Patent No.: US 8,438,024 B2
(45) Date of Patent: May 7, 2013

(54) INDEXING METHOD FOR QUICK SEARCH OF VOICE RECOGNITION RESULTS

(75) Inventor: Kenneth D. White, Boca Raton, FL (US)

(73) Assignee: International Business Machines Corporation, Armonk, NY (US)

(*) Notice: Subject to any disclaimer, the term of this patent is extended or adjusted under 35 U.S.C. 154(b) by 985 days.

(21) Appl. No.: 11/868,095

(22) Filed: Oct. 5, 2007

(65) Prior Publication Data

US 2009/0094030 A1     Apr. 9, 2009

(51) Int. Cl.
*G10L 15/26* (2006.01)

(52) U.S. Cl.
USPC .......................................... 704/235; 705/246

(58) Field of Classification Search .................. 704/235, 704/246

See application file for complete search history.

(56) References Cited

U.S. PATENT DOCUMENTS

2007/0033531 A1* 2/2007 Marsh ........................... 715/738

* cited by examiner

*Primary Examiner* — Jakieda Jackson

(74) *Attorney, Agent, or Firm* — Yudell Isidore Ng Russell PLLC

(57) ABSTRACT

A method, system and computer program product for receiving a spoken request to obtain indexed results from a database. Like result types are assigned to categories, and within each category is a plurality of result entries. The result indices are hexadecimal encoded, and each hexadecimal encoding is preceded by an initial character representing the result category. A speech recognition system is engaged, which processes the spoken request. When a item is requested, the respective category is implicitly known by the index returned, and the index provides direct access within a database to the corresponding result based on the phonetics of the request.

12 Claims, 5 Drawing Sheets

| Category: Music 300 | Table 302 | |
|---|---|---|
| | Hex Encoding 304 | Song Title 306 |
| M₁ | M001 | A Beginning |
| M₂ | M002 | A Blues Serenade |
| M₃ | M003 | A Day in the Life |
| M₄ | M004 | A Day Together |
| M₅ | M005 | A Day Without Rain |
| ... | ... | ... |
| M₁₇₃ | M0AD | Summer Moon |
| M₁₇₄ | M0AE | Swan Lake |
| M₁₇₅ | M0AF | Til the End of Time |

Fig. 3

INDEXING METHOD FOR QUICK SEARCH OF VOICE RECOGNITION RESULTS

BACKGROUND

1. Technical Field

The present invention generally relates to computer systems and in particular to voice recognition usage within computer systems.

2. Description of the Related Art

Recently, databases operating with spoken file retrieval, or queries by voice, have become more utilized. From databases managed on a corporate level to databases operated in children's toys, computer based queries by voice are rapidly becoming a daily practice. Existing voice recognition systems allow a user to search various kinds of databases that contain documents, video, audio, and other files. Existing systems are completely text based in that when a user speaks an item's name, text results are returned for use in selecting items from within the database. However, often there are incredibly large numbers of text strings to be compared against and text searches are not efficient.

Systems have been proposed which compare the text or phonetic transcription of the user's voice input query with the phoneme (or text) annotation data in a database. The technique for matching the sequences of characters or phonemes firstly defines a set of features in the query, each feature being taken as an overlapping, fixed size fragment from either the text or phoneme string. Then the frequencies of the text (character) or phoneme occurrences are identified in both the query and the annotation. Finally, a measure of the similarity between the query and the annotation is determined utilizing a cosine measure of the frequencies of occurrences. Although this system is manageable, it is only efficient for a small database of files.

There are approximately 43 phonemes and roughly as many characters (letters and symbols) in the English language, any given phoneme or character may occur tens of thousands of times within a database. Typically, the recognition of phonemes may be 60% to 70% efficient, thereby increasing the difficulty of retrieving data where the phonetic query was misrecognised. If a database is large, then the previously mentioned retrieval method is long and inefficient. Searching through multiple files for a single document, song information text, or video (identification name for example) may be tedious and extremely time consuming. Current systems typically perform a linear search though potential matches within a database.

SUMMARY OF ILLUSTRATIVE EMBODIMENTS

Disclosed are a method, a system and a computer program product for processing a spoken request to indexed results directly within a database. Current systems do not combine database indexing directly with the results of voice recognition. Complex voice recognition systems are phoneme based. Voice recognition systems require predefinition of the structure of what can be spoken that consists of text and its associating phonetic spelling. Voice recognition systems do not care what text is returned as the result (or result list) for what a user says. The text is used by an application for further processing. Instead of text, a database index can be directly associated with the phonemes corresponding to what the index points to. Thus, when a result or results are returned they can be directly indexed within a database. This approach reduces search time to a constant time as opposed to linear (n) search time and reduces memory required by the voice recognition system. Text strings are at least 2 to 3 time longer in length with respect to indices. Thus, using direct indices as oppose to text strings reduces memory proportional to the cardinality of database size.

Direct indexing can be used to eliminate type or category selection. In one embodiment, a first request is made to select a category. Categories are utilized as a domain to index files within a local or remote database. Prior to receiving a spoken request for a particular entry, a spoken request for a category is received. The voice recognition system returns the category, which is then used to define the domain for a second spoken request from the user for an item within that category. In one embodiment, the direct indexing scheme includes category information to eliminate the need for the initial spoken request.

One simple implementation of a direct indexing scheme is use of an array for each category. An index associated with the phonetics used by a voice recognition system determines which array and points directly to an entry within a particular array. Indices can be encoded to reduce character size. For example hexadecimal encoding uses less characters to represent an index than decimal encodings. An initial character identifies a particular array.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 illustrates an example of indexing music entries and their hexadecimal encoded indices, according to one embodiment of the invention;

DETAILED DESCRIPTION OF AN ILLUSTRATIVE EMBODIMENT

Figure 1:
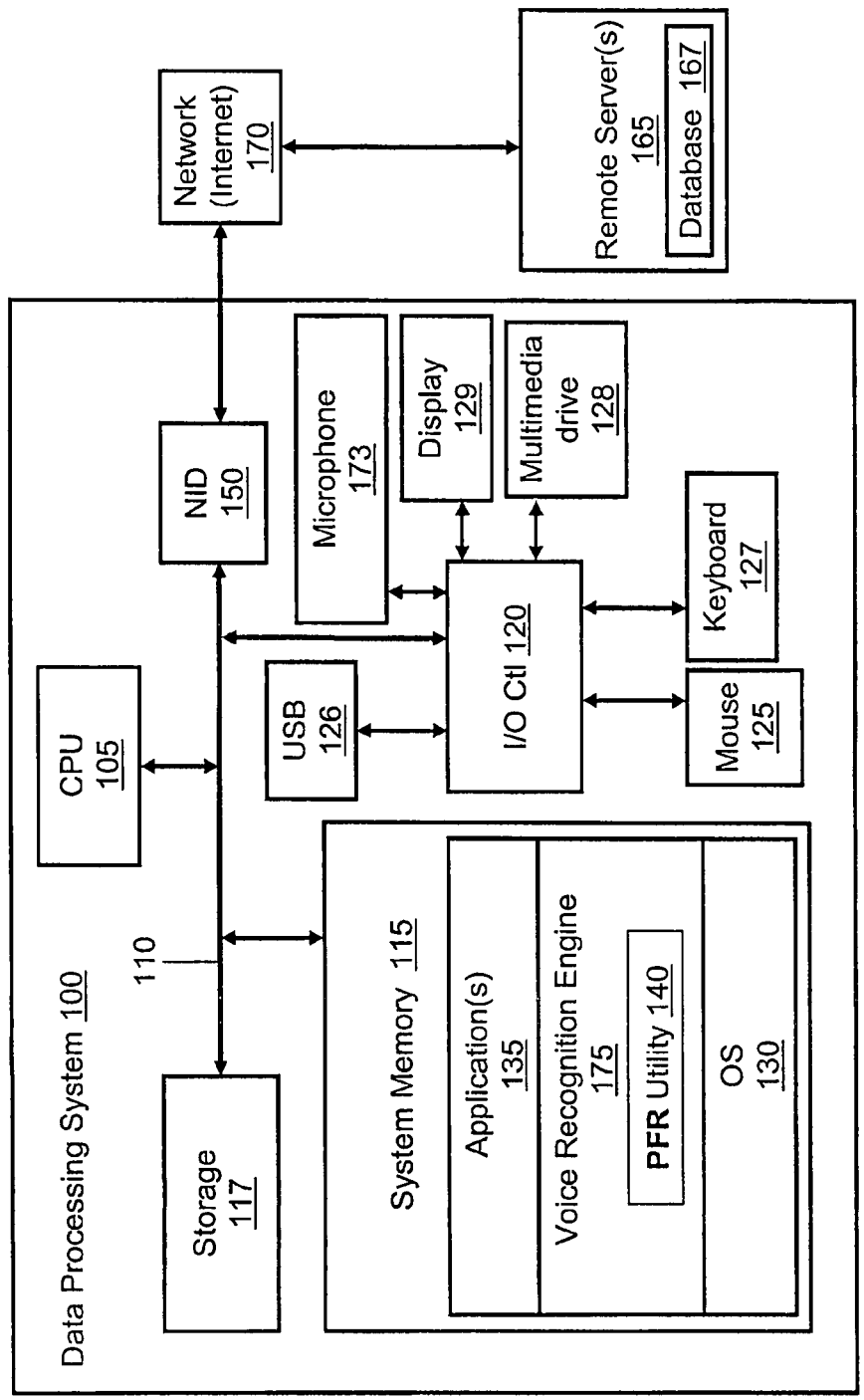
FIG. 1 is a diagram of an example data processing system, according to one embodiment of the invention.

The illustrative embodiments provide a method, system and computer program product for receiving a spoken request to obtain database indices. Like result types are assigned to categories, and within each category is a plurality of result entries. The result indices are hexadecimal encoded, and each hexadecimal encoding is preceded by an initial character representing the result category. A speech recognition system is engaged, which processes the spoken request. When a file is requested, the respective category is searched, independent of other categories, and the results can be directly indexed.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, FIG. 1, there is depicted a block diagram representation of a data processing system (and connected network). DPS 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 123 are illustrated, and output devices, of which display 129 is illustrated. Additionally, a multimedia drive 128 (e.g., CDRW or DVD drive), microphone 173, and USB (universal serial bus) hub 126 are illustrated, coupled to I/O controller 120. Multimedia drive 128 and USB hub 126 may operate as both input and output (storage) mechanisms. DPS 100 also comprises storage 117, within which data/instructions/code may be stored.

DPS 100 is also illustrated with a network interface device (NID) 150, with which DPS 100 connects to one or more servers 165 via an access network, such as the Internet 170. Remote server 165 comprises remote database 167.

In the described embodiments, Network 170 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within system memory 115 or other storage (e.g., storage 117) and executed by CPU 105. Thus, illustrated within system memory 115 are a number of software/firmware components, including operating system (OS) 130 (e.g., Microsoft Windows®, a trademark of Microsoft Corp, or GNU®/Linux®, registered trademarks of the Free Software Foundation and The Linux Mark Institute), applications 135, voice recognition engine 175, and phonetic file retrieval (PFR) utility 140. In actual implementation, applications 135 and PFR utility 140 may be combined as a single application collectively providing the various functions of each individual software component when the corresponding code is executed by CPU 105. For simplicity, PFR utility 140 is illustrated and described as a stand alone or separate software/firmware component, which provides specific functions, as described below.

CPU 110 executes PFR utility 140 as well as OS 130, which supports the user interface features of PFR utility 140. In the illustrative embodiment, PFR utility 140 generates/provides several graphical user interfaces (GUI) to enable user interaction with, or manipulation of, the functional features of the utility (145). Among the software code/instructions provided by PFR utility 140, and which are specific to the invention, are: (a) code for indexing one or more results according to the result type or category; (b) code for receiving a spoken request to obtain a result from a database; and (c) code for retrieving one or more results from a database, using a result index. For simplicity of the description, the collective body of code that enables these various features is referred to herein as PFR utility 140. According to the illustrative embodiment, when CPU 110 executes PFR utility 140, DPS 100 initiates a series of functional processes that enable the above functional features as well as additional features/functionality, which are described below within the description of FIGS. 2-5.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
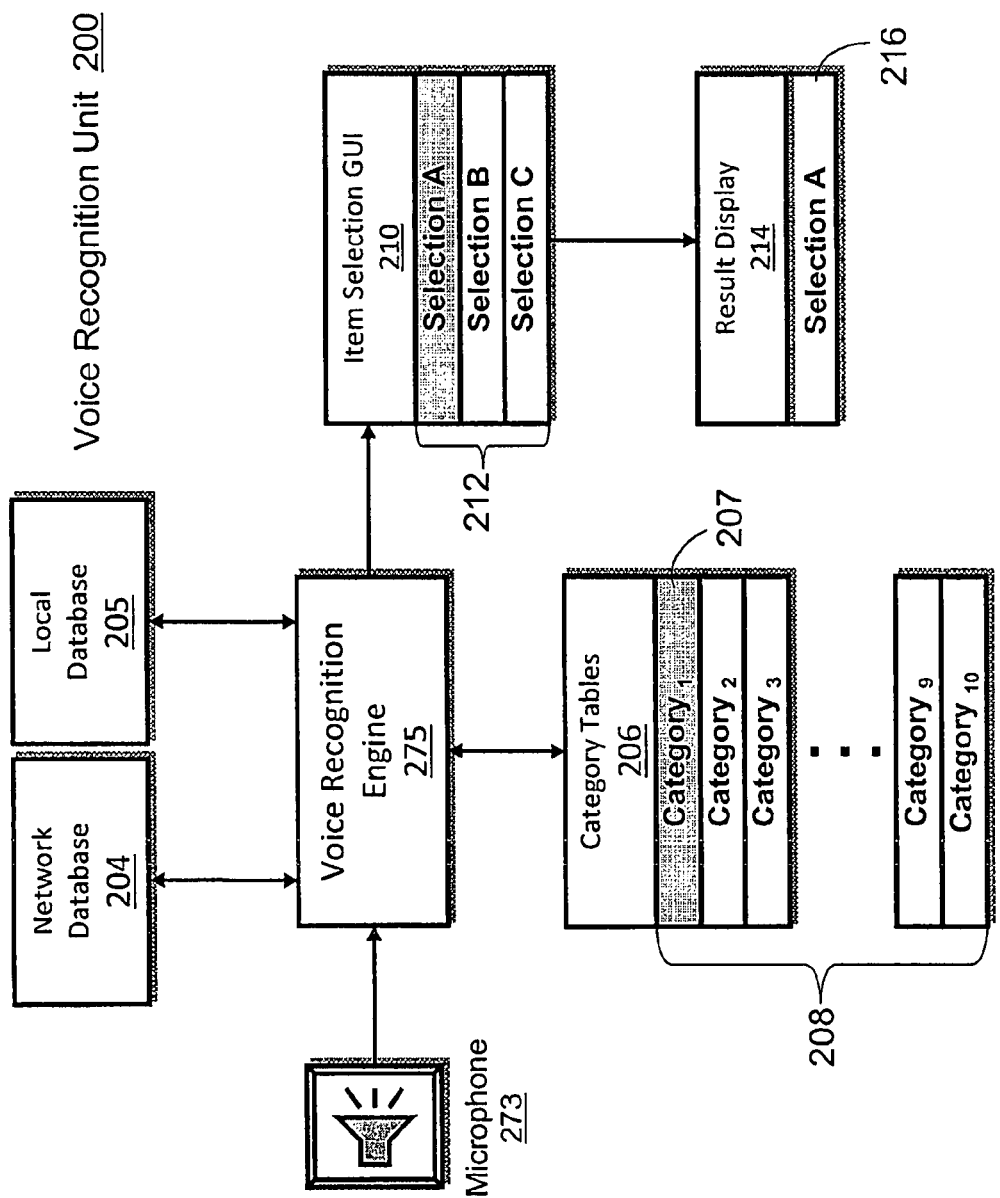
FIG. 2 illustrates a voice recognition unit, in accordance with one embodiment of the invention.
Figure 4:
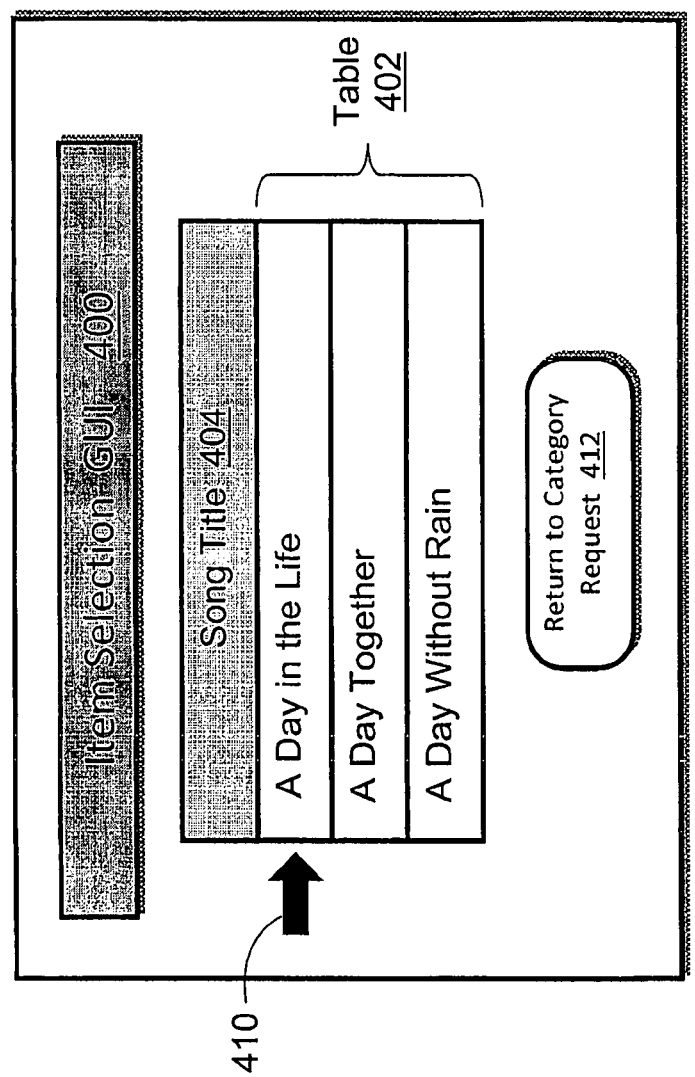
FIG. 4 illustrates a graphical user interface with results from a voice recognition of music retrieval, in accordance with one embodiment of the invention.

With reference now to FIG. 2 which illustrates components a voice recognition unit. Voice recognition unit 200 of FIG. 2, comprises microphone 273, which transmits to voice recognition engine 275. Voice recognition engine 275 transmits and receives data from network database 204, and local database 205. Both category tables 206 and indexed results 212 may be stored in network database 204 and/or local database 206. Network database 204 and local database 205 are accessible via DPS 100 of FIG. 1. Category table 206 is received from network database 204 and/or local database 205. File selection GUI 210 displays one or more results to be selected, then the selected result 216 is outputted to the display 214.

In one embodiment, before retrieving the result, the target category is selected from a plurality of categories. Retrieving the category implicit with the result provides an efficient indexing technique which may be utilized in a retrieval system to identify areas of a database for searching. A request may be a typed request or a phonetic request each transmitted to PFR utility 140 within voice recognition engine 275. After the category has been determined the result is processed.

In one embodiment, microphone 273 receives a voice query to retrieve a result. The voice query is transmitted from microphone 273 to the voice recognition engine 275. Within the voice recognition engine 275, the voice query is converted into one or more results with their corresponding indices returned by the PFR utility 140. A result index immediately identifies a category, e.g., category 1 207 of available categories 208. An index also identifies a specific result within the category (207). The database is indexed by the result indices, which are listed in item selection GUI 210, beginning with the result that matches the voice query the best. From the item selection GUI 210 the target result, selection A 216, is chosen and transmitted to the result display 214.

FIG. 3 illustrates indexing result entries within a category. Within category 300 is a plurality of result entries. Table 300 of FIG. 3 comprises result entries (song titles) 306, hexadecimal encoded indices 304 that could be implemented as an array pointer or index 308. In one embodiment, to create the index, a large array or table 302 is produced. Each entry is addressed by an index array pointer 308, which has a value related to the position of the file entry in table 302 that is preceded by the category initial. Index array pointer 308 identifies the relevant locations within category 300 where the text data associated with the result entry can be located. The result entry address also comprises hexadecimal encoding 304, which is a data field that stores the encoding associated with the result entry (titles) 306.

In one embodiment, category 300 is selected from a plurality of categories, such as in FIG. 2. The phonemes corresponding to all potential results are used to determine one or more results corresponding to the result entries 306. Selected result entry 310 is selected as the result entry that most closely compares to the voice query. GUI 400 has a table 400 comprising result (song titles) 404, and a selected result entry 410. Selected result entry 310 and one or more closely related results entries are displayed by the graphical user interface (GUI) 402. Return selection 412, will allow the user to revisit or restate the original voice query if the target result is not available or incorrect.

Figure 5:
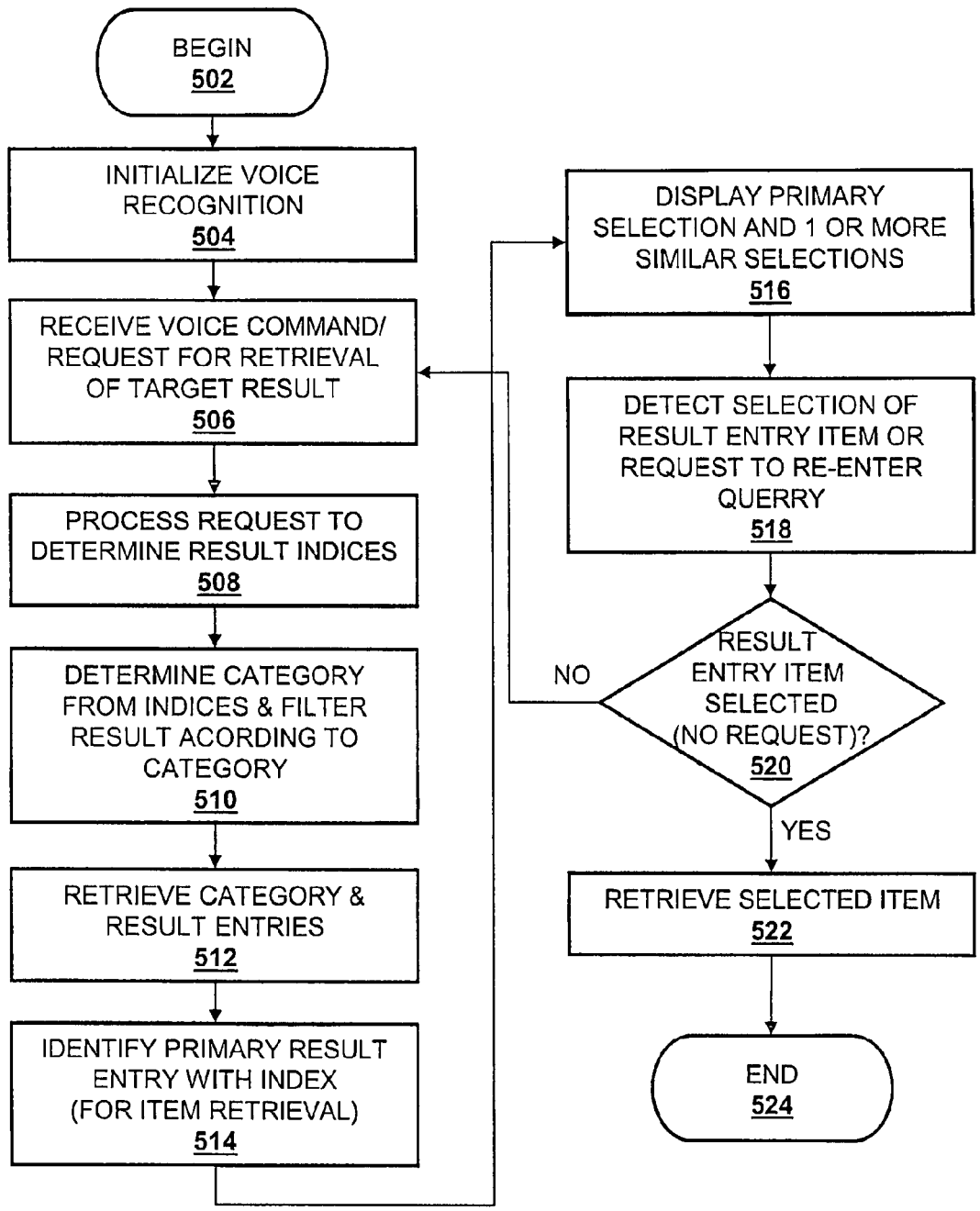
FIG. 5 is a logic flow chart illustrating the process of item retrieval utilizing voice recognition according to one embodiment of the invention.

FIG. 5 is a flow chart illustrating various methods by which the above processes of the illustrative embodiments are completed. Although the methods illustrated in FIG. 5 may be described with reference to components shown in FIGS. 1-4, it should be understood that this is merely for convenience and alternative components and/or configurations thereof can be employed when implementing the various methods. Key portions of the methods may be completed by PFR utility 140 executing within DPS 100 (FIG. 1) and controlling specific operations on DPS 100, and the methods are thus described from the perspective of both PFC utility 140 and DPS 100.

The process of FIG. 5 begins at initiator block 502 and proceeds to block 504, at which voice recognition engine 175 is initialized. PFR utility 140 receives the voice or typed command/query for the target result entry via microphone 173, at block 506. At block 508, the request for the result entry is processed to identify corresponding result indices. At this step, PFR utility 140 may search local and/or remote databases to acquire the target category and possible result entries. Result indices are utilized to determine categories and the result entries are filtered according to the category at block 510. At block 512, result entries for the category identified are obtained. To retrieve the results at blocks 508-512, the voice query is processed by the voice recognition engine using the phonemes associated with all potential results to identify corresponding indices, which contain the category indications.

The primary result entry is identified at block 514 based on the result index (indices). At block 516, the primary result entry which most closely relates to the voice query is displayed on a GUI with one or more similarly related result entries. One of the result entries may be selected at block 518, or a request to re-enter the query or enter a new query may be received, perhaps if the current selections are not correct. If a command is received to return to voice command for result retrieval, the utility returns to block 506, where the request is restated. At step 520, a decision is made whether the result entry item (or one of the displayed items) is selected. If no result is selected, the utility may provide the query entry interface to receive a new request. If a result entry is selected, the result entry is retrieved for further activity (such as playing, downloading, saving, and deleting, in the case of a music file, for example) at block 522. The process ends at block 524.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:
    receiving a spoken request to obtain an item from a database;
    converting the spoken request into one or more indices representing the request, wherein each index has a category delimiter of an associated result category;
    retrieving one or more result entries from the database by utilizing the one or more indices, wherein the result entries within the database are indexed by a corresponding result category;
    associating a first result entry identified by the one or more indices corresponding to the spoken request with a first selection of a category most closely associated with the spoken request; and
    displaying a first result entry retrieved and one or more closely related results within the result category on a graphic user interface that identifies the first category and the one or more result entries retrieved and enables selection of one of the displayed result entries.

2. The method of claim 1, wherein indexing further comprises:
    indexing one or more results within the database according to a result category;
    automatically encoding result entries of an index with a hexadecimal label, wherein a result entry's index is hexadecimal encoded, and the hexadecimal encoding is preceded by an initial character representing the result category;
    prefacing the hexadecimal label of the indexed entries with a character representing the result category;
    organizing like result types within a result category, wherein when an item is requested, a specific category is known implicitly by the index returned by a speech recognition engine, wherein the speech recognition system outputs a sequence of result indices associated with database items according to phonetics of the voice request; and
    engaging the speech recognition system for processing spoken requests for a result, wherein said speech recognition engine compares the phonetics of the spoken request for an item with a plurality of database entries within a target category.

3. The method of claim 2, further comprising:
    storing a plurality of indexed categories and results on a local computer system;
    storing a plurality of indexed categories and results on a remote computer system; and
    storing an index having a plurality of result entries, each result entry having an associated hexadecimal identifier for identifying the result entry.

4. The method of claim 1, further comprises:
    receiving a selection of an indexed result entry displayed on the interface; and
    loading the selected result on the local data processing system for further manipulation thereof.

5. A computer program product comprising:
    a recordable type, tangible storage device; and
    program code on the recordable type, tangible storage device that when executed by a processor provides the functions of:
        receiving a spoken request to obtain an item from a database;
        converting the spoken request into one or more indices representing the request, wherein each index has a category delimiter of an associated result category;
        retrieving one or more result entries from the database by utilizing the one or more indices, wherein the result entries within the database are indexed by a corresponding result category;
        associating a first result entry identified by the one or more indices corresponding to the spoken request with a first selection of a category most closely associated with the spoken request; and
        displaying a first result entry retrieved and one or more closely related results within the result category on a graphic user interface that identifies the first category and the one or more result entries retrieved and enables selection of one of the displayed result entries.

6. The computer program product of claim 5, wherein the code for indexing further comprises program code for:
    indexing one or more results within the database according to a result category;
    automatically encoding result entries of an index with a hexadecimal label, wherein a result entry's index is hexadecimal encoded, and the hexadecimal encoding is preceded by an initial character representing the result category;
    prefacing the hexadecimal label of the indexed entries with a character representing the result category;
    organizing like result types within a result category, wherein when an item is requested, a specific category is known implicitly by the index returned by a speech recognition engine, wherein the speech recognition system outputs a sequence of result indices associated with database items according to phonetics of the voice request; and
    engaging the speech recognition system for processing spoken requests for a result, wherein said speech recognition engine compares the phonetics of the spoken request for an item with a plurality of database entries within a target category.

7. The computer program product of claim 6, further comprising program code for:
    storing a plurality of indexed categories and results on a local computer system;
    storing a plurality of indexed categories and results on a remote computer system; and
    storing an index having a plurality of result entries, each result entry having an associated hexadecimal identifier for identifying the result entry.

8. The computer program product of claim 5, further comprising program code for:
    receiving a selection of an indexed result entry displayed on the interface; and
    loading the selected result on the local data processing system for further manipulation thereof.

9. An electronic device comprising:
    a processor component;
    an input/output (I/O) mechanism that receives phonetic commands including spoken request;
    a mechanism for outputting result entries based on the spoken request;
    a speech recognition engine for processing the spoken request; and
    a utility executing on the processor component and which comprises codes that enables completion of the functions of:
        receiving a spoken request to obtain an item from a database;

converting the spoken request into one or more indices representing the request, wherein each index has a category delimiter of an associated result category;

retrieving one or more result entries from the database by utilizing the one or more indices, wherein the result entries within the database are indexed by a corresponding result category;

associating a first result entry identified by the one or more indices corresponding to the spoken request with a first selection of a category most closely associated with the spoken request; and displaying a first result entry retrieved and one or more closely related results within the result category on a graphic user interface that identifies the first category and the one or more result entries retrieved and enables selection of one of the displayed result entries.

10. The electronic device of claim 9, wherein the utility function of indexing further comprises:

indexing one or more results within the database according to a result category;

automatically encoding result entries of an index with a hexadecimal label, wherein a result entry's index is hexadecimal encoded, and the hexadecimal encoding is preceded by an initial character representing the result category;

prefacing the hexadecimal label of the indexed entries with a character representing the result category;

organizing like result types within a result category, wherein when an item is requested, a specific category is known implicitly by the index returned by the speech recognition engine, wherein the speech recognition system outputs a sequence of result indices associated with database items according to phonetics of the voice request; and engaging the speech recognition system for processing spoken requests for a result, wherein said speech recognition engine compares the phonetics of the spoken request for an item with a plurality of database entries within a target category.

11. The electronic device of claim 9, wherein said utility functions further comprises:

storing a plurality of indexed categories and results on a local computer system;

storing a plurality of indexed categories and results on a remote computer system; and storing an index having a plurality of result entries, each result entry having an associated hexadecimal identifier for identifying the result entry.

12. The electronic device of claim 9, wherein said utility functions further comprises:

receiving a selection of an indexed result entry displayed on the interface; and loading the selected result on the local data processing system for further manipulation thereof.

* * * * *